United States Patent [19]
Hernandez

[11] Patent Number: 5,097,250
[45] Date of Patent: Mar. 17, 1992

[54] ELECTRONIC TRAILER GUIDE

[76] Inventor: David Hernandez, 4901 Overland N.E., Albuquerque, N. Mex. 87109

[21] Appl. No.: 646,092

[22] Filed: Jan. 25, 1991

[51] Int. Cl.⁵ ................... B60Q 1/00; G08B 21/00
[52] U.S. Cl. ..................... 340/438; 340/431; 340/440; 340/686; 340/687; 340/689; 280/DIG. 14; 180/271; 180/282
[58] Field of Search ........ 340/438, 440, 431, 686-689; 280/47.131, DIG. 1, DIG. 9, DIG. 14; 180/271, 282

[56] References Cited

U.S. PATENT DOCUMENTS

| | | | |
|---|---|---|---|
| 3,605,088 | 9/1971 | Savelli | 340/431 |
| 3,734,539 | 5/1973 | Salmi | 340/686 |
| 3,995,251 | 11/1976 | Jones | 340/686 |
| 4,187,494 | 2/1980 | Jessee | 340/686 |
| 4,938,495 | 7/1990 | Beasley et al. | 340/686 |

Primary Examiner—Donnie L. Crosland
Attorney, Agent, or Firm—William E. Hein

[57] ABSTRACT

An electronic trailer guide includes sensors and associated logic and display circuitry that serve to present information to the driver of a towing vehicle as to the direction in which he must turn the steering wheel of the towing vehicle to back a trailer into a desired position, as to whether the trailer is tilted to the left or to the right, as to whether, when backing a boat trailer down a boat ramp into a body of water preparatory to launching a boat, the water level has risen to a point beneath the towing vehicle at which there is a risk of damage to the vehicle and, as to whether, when backing a boat trailer down a boat ramp into a body of water, the water has buoyantly lifted the boat off of the trailer so that it may be launched.

3 Claims, 3 Drawing Sheets

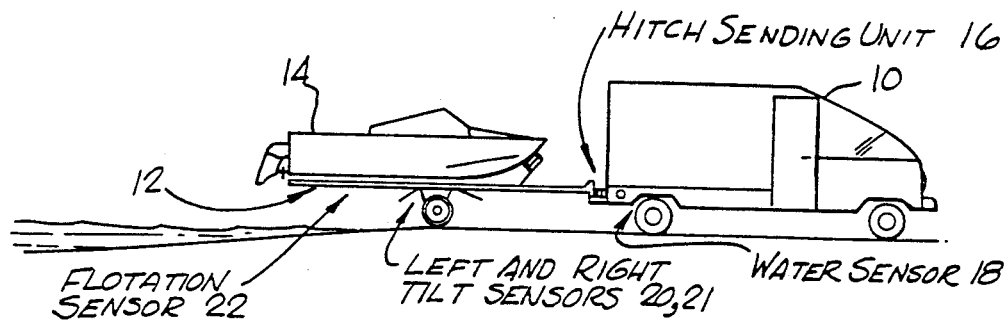
FIG. 1
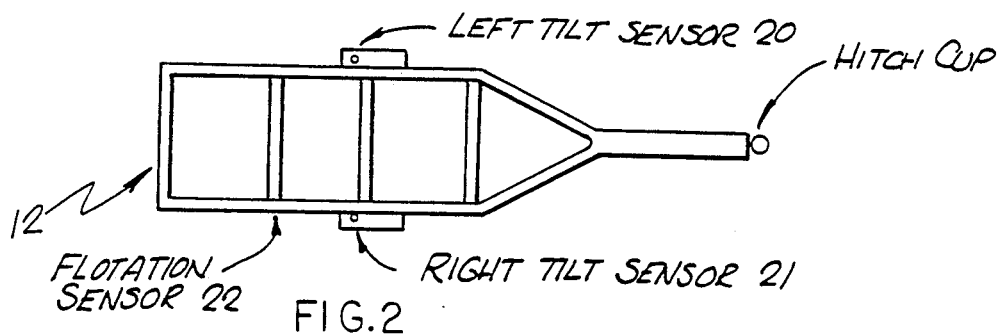
FIG. 2
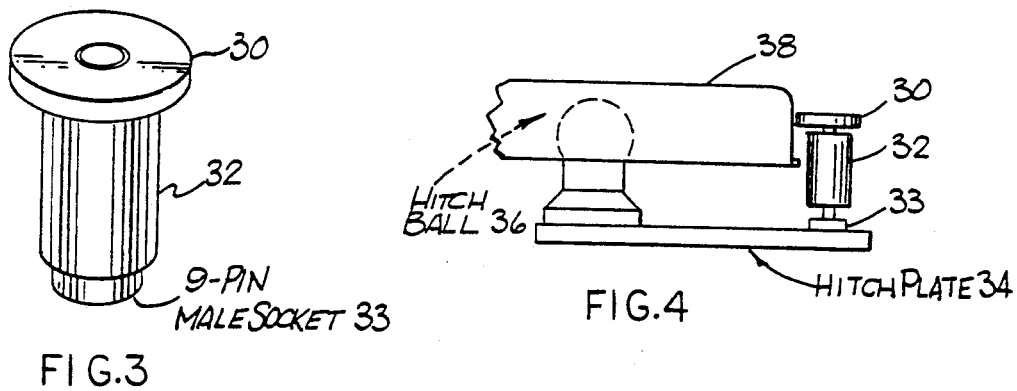
FIG. 3
FIG. 4
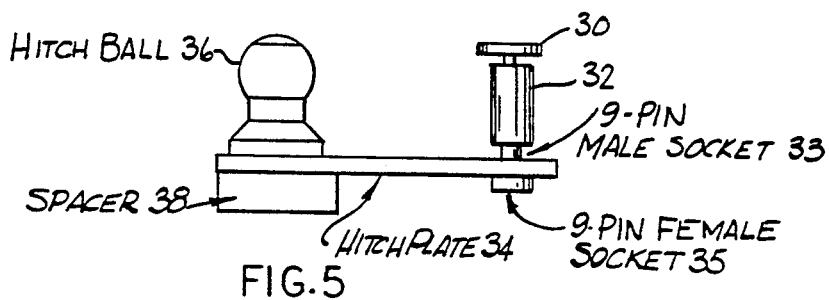
FIG. 5

ELECTRONIC TRAILER GUIDE

BACKGROUND AND SUMMARY OF THE INVENTION

This invention relates generally to trailers towed behind towing vehicles and more particularly to an electronic trailer guide that senses various position parameters of the trailer and provides that information to the driver of the towing vehicle. When using a recreational vehicle (RV) to tow a boat trailer, blind spots appear to the driver of the RV when attempting to view the trailer in his rear view mirrors. These blind spots present a safety problem and are especially troublesome for the driver of an RV who is attempting to back a boat trailer down a boat ramp and into the water preparatory to launching a boat. By the time that the trailer comes into view in the rear view mirrors of the RV, it is often too late for the driver to make a steering correction that will result in the desired change in direction of backward travel of the trailer. As a result the driver must pull forward to align the RV and the trailer and then once again attempt to back the trailer into the desired position. Unless the driver of the towing vehicle is very experienced, it may be necessary to repeat this process a number of times until the trailer is successfully backed into the desired position, for example, to launch a trailered boat. A further problem exists when backing a boat trailer down a boat ramp and into the water in preparation for launching a boat. Because of the aforementioned blind spots, it is not possible for the driver of the towing RV to determine when the trailer has been backed far enough into the water to permit launching of the boat. As a result, the driver must guess as to the position of the trailer and then leave his RV to confirm its position with respect to the water level. If he has not backed far enough into the water to permit launching the boat, he must return to his vehicle and back further into the water. If he has backed further into the water than is necessary to launch the boat, it is likely that water will have reached the floor of the RV and may result in damage to the RV. Finally, it is nearly impossible to load a floating mid size or larger boat onto a trailer unless the trailer is parked so a to be level from side to side.

One attempt that has been made in the prior art to solve the aforementioned problems involves the use of a television camera to assist the driver of a towing vehicle to view the position of the trailer he is towing. However these television systems are quite expensive and do not provide the driver with clear information as to which direction he needs to turn while backing his vehicle in order to correct the direction of travel of the trailer. These prior art television systems also do not provide the driver with information as to how far into the water he must back in order to launch a trailered boat without going so far a to risk water damage to the towing vehicle, and they also do not provide the driver with information as to whether the trailer is sufficiently level to permit loading a floating boat.

It is therefore an object of the present invention to provide an electronic trailer guide that presents information to the drive of the towing vehicle as to the direction in which he must turn the steering wheel of the towing vehicle in order to back a trailer into a desired position.

It is a further object of the present invention to provide an electronic trailer guide that presents information to the driver of the towing vehicle as to how far into the water he may back a boat trailer without risking water damage to the towing vehicle.

It is a further object of the present invention to provide an electronic trailer guide that presents information to the driver of the towing vehicle as to whether an attached boat trailer is sufficiently level from side to side to permit the loading of a floating boat.

It is yet another object of the present invention to provide an electronic trailer guide that presents information to the driver of the towing vehicle while he is backing a boat trailer down a boat ramp and into a body of water as to the point at which the boat lifts off the boat trailer due to water buoyancy.

These and other incidental objects ar accomplished in accordance with the illustrated preferred embodiment of the present invention by employing left and right tilt sensors mounted beneath the left and right fenders, respectively, of a boat trailer, a water sensor mounted at the highest point beneath a towing vehicle proximate the rear thereof, a flotation sensor mounted on a cross member of the boat trailer rearward of the wheels thereof, and a hitch sending unit mounted on the towing vehicle in alignment with a hitch ball to sense the degree of misalignment between the towing vehicle and the boat trailer. Signals from these various sensors are processed by logic circuitry and result in presentation of a visual indication to the driver of the position parameters sensed.

BRIEF DESCRIPTION OF THE DRAWINGS

FIG. 1 is a pictorial diagram illustrating the general positions of the sensors employed in the electronic trailer guide of the present invention to sense various position parameters that convey information useful to the drive of a vehicle when backing a boat trailer down a boat ramp and into a body of water preparatory to launching a boat trailered thereon.

FIG. 2 is a pictorial diagram illustrating the typical positions of the various sensors mounted on the boat trailer of FIG. 1.

FIG. 3 is a pictorial diagram of a hitch sending unit for sensing the degree of misalignment of the boat trailer and the towing vehicle illustrated in FIG. 1.

FIG. 4 is a pictorial diagram of a hitch assembly illustrating the way in which the hitch sending unit of FIG. 3 engages the hitch of the trailer of FIG. 1.

FIG. 5 is a pictorial diagram of the hitch plate assembly of FIG. 4 with the hitch cover removed to illustrate the details of the hitch assembly.

DETAILED DESCRIPTION OF THE INVENTION

Figures 6, 7:
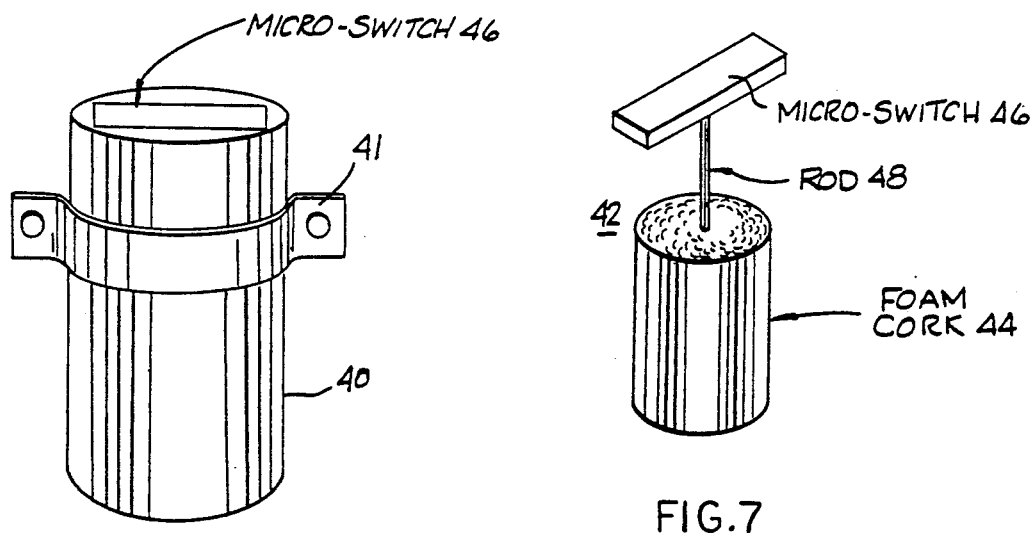
FIG. 6 is a pictorial diagram of a water sensor housing that houses the water sensor mounted to the towing vehicle, as illustrated in FIG. 1.
FIG. 7 is a pictorial diagram illustrating the details of the water sensor housed in the water sensor housing of FIG. 6.

Referring now to FIGS. 1 and 2, there are shown a towing vehicle 10, a towed boat trailer 12, and a boat 14 positioned in a conventional manner on boat trailer 12. In accordance with the present invention, a number of position parameter sensors are positioned at various locations on the towing vehicle 10 and the boat trailer 12. A hitch sending unit 16 senses the degree of misalignment of the towing vehicle 10 and the boat trailer 12. A water sensor 18 is mounted to the underside of the towing vehicle 10 proximate the rear thereof to sense the presence of water at that point when backing boat trailer 12 down a boat ramp in preparation for launching boat 14. A pair of tilt sensors 20, 21, each of which may comprise a conventional reed switch, are preferably mounted o the undersides of the left and right fenders of boat trailer 12 to sense a left tilting or right tilting condition of boat trailer 12. A flotation sensor 22 is attached to a conventional cross member of the frame of boat trailer 12 to sense that the boat 14 has lifted off trailer 12 due to water buoyancy as towing vehicle 10 and boat trailer 12 are being backed down a boat ramp into a body of water.

Referring now to FIGS. 3-5, there are shown the details of the hitch sending unit 16 of FIG. 1. Hitch sending unit 16 comprises a rubber wheel 30 that rotationally drives an encased conventional rotary single pole, six throw switch 32. Hitch sending unit 16 is mounted to a hitch plate 34 at the rear of towing vehicle 10 in alignment with a conventional hitch ball 36, also mounted to hitch plate 34, and to which boat trailer 12 is connected. A conventional hitch cover 38 engages rubber wheel 30. Depending o the alignment between boat trailer 12 and towing vehicle 10, six-position rotary switch 32 is set to a different one of its six positions through engagement between rubber wheel 30 and hitch cover 38, thereby effectively sensing the degree of alignment between boat trailer 12 and towing vehicle 10. A 9-pin male electrical socket 33 at the bottom of rotary switch 32 and a mating female electrical socket 35 provide electrical connection to the contacts of rotary switch 32. Hitch plate 34 includes holes for receiving conventional hitch ball 36 as well as the 9-pin male electrical socket 33 at the bottom of rotary switch 32. A hitch spacer 38 is mounted between the rear bumper of towing vehicle 10 and hitch plate 34 to provide clearance for 9-pin electrical socket 35 and its attendant wiring.

Referring now to FIGS. 6 and 7, there are shown the details of water sensor 18 of FIGS. 1 and 2. A housing 40, that may simply comprise a length of PVC tubing, is conveniently attached at the highest point on the underside of towing vehicle 10 proximate the rear thereof via a bracket 41. A water sensor assembly is mounted inside housing 40 and includes a foam cork 44, a micro switch 46, and a rod 48 connected therebetween. When towing vehicle 10 and boat trailer 12 are backed as far down a boat ramp as safely permitted, water enters an opening in the bottom of housing 40 and buoyantly urges foam cork 44 upward, thereby actuating micro switch 46 to indicate the presence of water at the point of attachment of water sensor 18 to towing vehicle 10.

Figure 8:
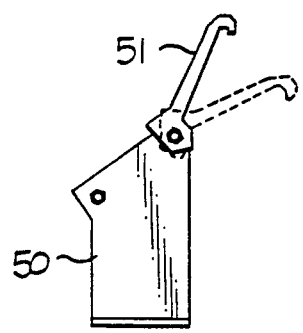
FIG. 8 is a pictorial diagram of the flotation sensor of FIGS. 1 and 2.

Referring now to FIG. 8, there is illustrated a conventional micro switch assembly 50 of a type that may be chosen to perform the function of flotation sensor 18 of FIGS. 1 and 2. Micro switch assembly 50 may include a conventional roller SPST micro switch of the type manufactured by Unimax and distributed by Johnstone Supply as part no. G22-595. A lever 51 of micro switch assembly 50 is permitted to move by spring action to an upper position as boat 14 is bouyantly lifted off of boat trailer 12 by the body of water into which it is backed, thereby indicating that boat trailer 12 has been backed far enough into the water to permit launching of boat 14. Micro switch assembly 50 is preferably wrapped with a plastic material to render it waterproof.

Figure 9:
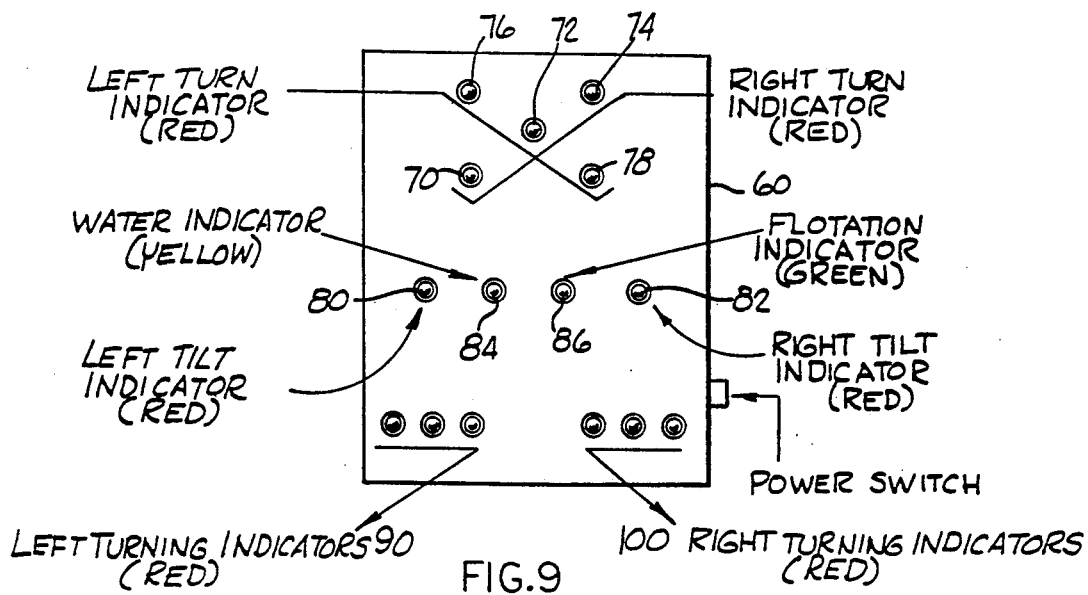
FIG. 9 is a pictorial diagram of a control panel mounted in the towing vehicle of FIG. 1 illustrating the layout of a plurality of LED indicators that serve to provide an indication to the driver of the positional parameters sensed by the electronic trailer guide of the present invention.

Referring now to FIG. 9, there are shown a plurality of LED indicators on a control box panel 60 that is positioned in the cab of towing vehicle 10 of FIG. 1 for viewing by the driver. The plurality of LED indicators on control box panel 60 are driven by the circuitry illustrated in the detailed schematic diagram of FIG. 10. This circuitry may be conveniently located in a control box (not illustrated) that is associated with control box panel 60 or it may be located separate and apart from control box panel 60. Five LED indicators 70, 72, 74, 76, 78 at the top of control box panel 60 indicate to the driver whether the steering wheel of the towing vehicle 10 should be turned to the left or to the right in order to align the towing vehicle 10 with the boat trailer 12. When LED indicators 70, 72, 74 are all turned on, the driver should turn the steering wheel of the towing vehicle 10 to the right. When LED indicators 72, 76, 78 are all turned on, the driver should turn the steering wheel of the towing vehicle 10 to the left. LED indicator 72 remains on at all times. A tilting of boat trailer 12 toward the left, as sensed by tilt sensor 20 mounted under the left fender of boat trailer 12, is indicated when LED indicator 80 is turned on. Similarly, a tilting of boat trailer 12 toward the right, as sensed by tilt sensor 21 mounted under the right fender of boat trailer 12, is indicated when LED indicator 82 is turned on. A water level LED indicator 84 is turned on when water sensor 18 mounted at the rear of towing vehicle 10 senses the that boat 14 has buoyantly lifted off of boat trailer 12 as it is being backed into a body of water for launching. A flotation LED indicator 86 is turned on when flotation sensor 22 mounted on a cross member of boat trailer 12 senses the presence of water at that point. Three directional LED indicators 90 in the lower left corner of control box panel 60 indicate a left turn of the boat trailer 12, a shallow turn being indicated when one of the three LED indicators 90 is turned o and progressively steeper turns being indicated when other ones of the LED indicators 90 are turned on. Similarly, three other directional LED indicators 100 in the lower right corner of control box panel 60 indicate a right turn of boat trailer 12.

Figure 10:
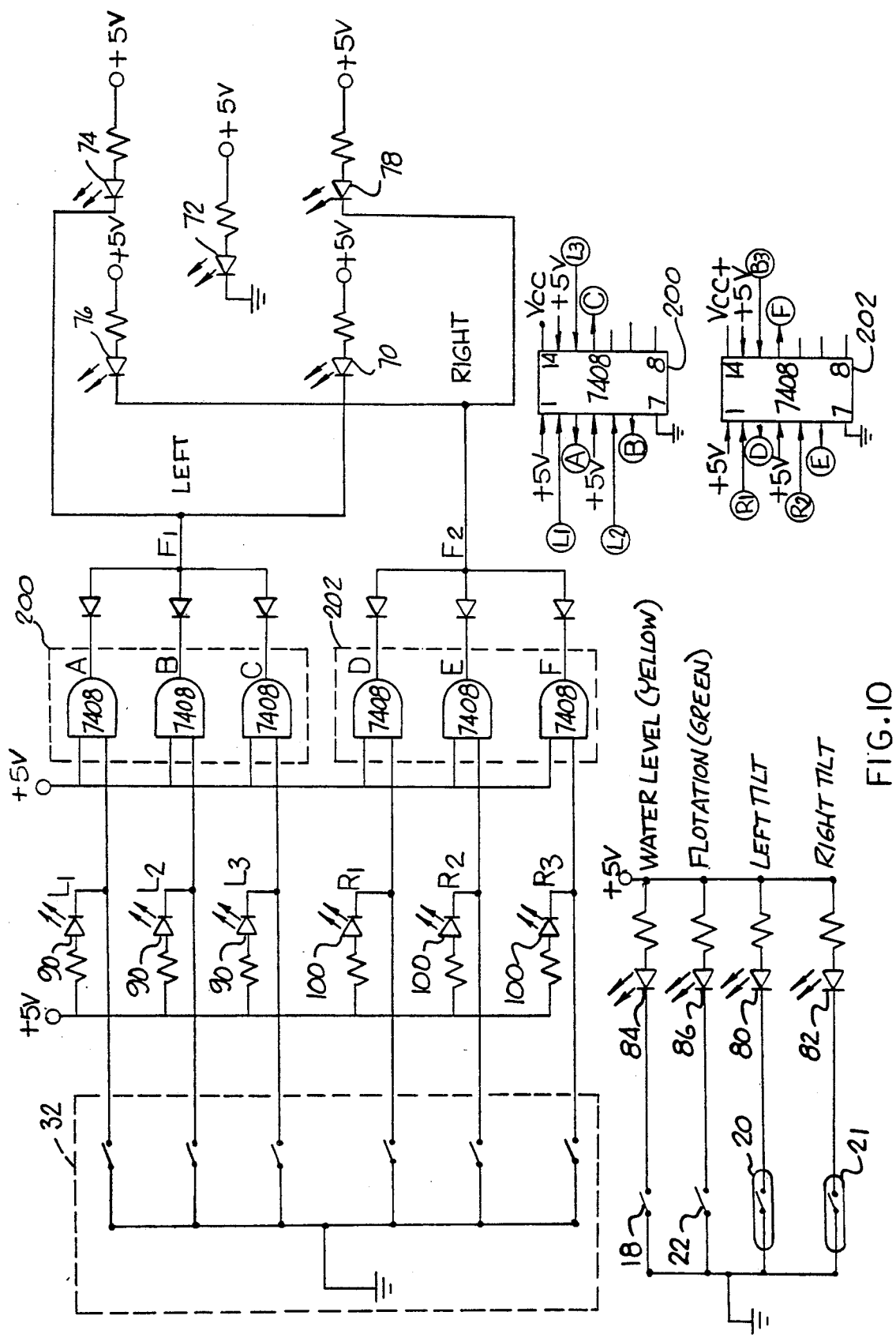
FIG. 10 is a detailed schematic diagram of circuitry forming a portion of the electronic trailer guide of the present invention.

The control circuitry of the electronic trailer guide of the present invention, as illustrated in the detailed schematic diagram of FIG. 10, comprises a pair of off-the-shelf 7408 quad 2-input AND gates 200, 202. The pin connection details of AND gates 200, 202 are also shown in FIG. 10. All of the LED indicators illustrated in FIGS. 9 and 10 are connected to a source of +5 volts D.C. through current limiting 220-ohm resistors. When any of the sensing switches 18, 20, 21, 22, 32 is closed, a circuit to ground is complete, thereby turning on the associated LED indicators. Any one of the LED indicators that is turned on will send a lo signal to the corresponding AND gate. AND gates 200, 202 are employed to complete the path to ground for the five LED indicators 70, 72, 74, 76, 78 that indicate to the driver the direction in which he should turn the steering wheel of towing vehicle 10 to align it with boat trailer 12.

While the present invention has been described a having particular application to the combination of a towing vehicle such as an RV and a towed boat trailer, it will be understood that the features of this invention may be readily applied to any combination of towing and towed vehicles in order to provide the driver of the towing vehicle with information regarding alignment and tilt parameters, for example, of the towed vehicle that will greatly improve safety and ease of handling when it is desired to back the combination of vehicles into a desired position.

I claim:

1. An electronic trailer guide for sensing certain parameters regarding the positional relationship between a towing vehicle and a trailer being backed into a desired position by the towing vehicle, the electronic trailer guide comprising:

alignment sensor means coupled to the towing vehicle and the trailer at a point of attachment therebetween for sensing a degree of misalignment between the towing vehicle and the trailer;

left and right tilt sensor means coupled to the trailer at points proximate the left and right sides thereof, respectively, for sensing a left tilt condition and a right tilt condition of the trailer; and logic circuitry/display means coupled to the alignment sensor means and to the left and right tilt sensor means, said logic circuitry/display means being responsive to said left and right tilt sensor means for providing a visual indication to the driver of the towing vehicle when either of a left tilt condition and a right tilt condition of the trailer has been sensed, said logic circuitry/display means being further responsive to said alignment sensor means for providing a visual indication to the driver of the towing vehicle of the direction in which a steering wheel of the towing vehicle must be turned in order to align the towing vehicle and the trailer.

2. An electronic trailer guide as in claim 1 wherein said logic circuitry/display means is further responsive to said alignment sensor means for providing a visual indication to the driver of the towing vehicle of the degree of misalignment between the towing vehicle and the trailer.

3. An electronic trailer guide as in claim 1 wherein said trailer comprises a boat trailer for trailering a boat thereon, the electronic trailer guide further comprising:

water sensor means mounted to an underneath surface of the towing vehicle proximate a rear end thereof for sensing the presence of water when the boat trailer is being backed down a boat ramp into a body of water, said logic circuitry/display means being coupled to said water sensor means and being responsive thereto for providing a visual indication to the driver of the towing vehicle at such time as water is sensed by said water sensor means; and flotation sensor means mounted to a structural member of said boat trailer for sensing, as the boat trailer is being backed down a boat ramp into a body of water, the point in time at which the boat is buoyantly lifted off of the boat trailer, said logic circuitry/display means being coupled to said flotation sensor means and being responsive thereto for providing a visual indication to the driver of the towing vehicle at the point in time at which the boat is buoyantly lifted off of the boat trailer.

* * * * *